United States Patent Office 3,267,649
Patented August 23, 1966

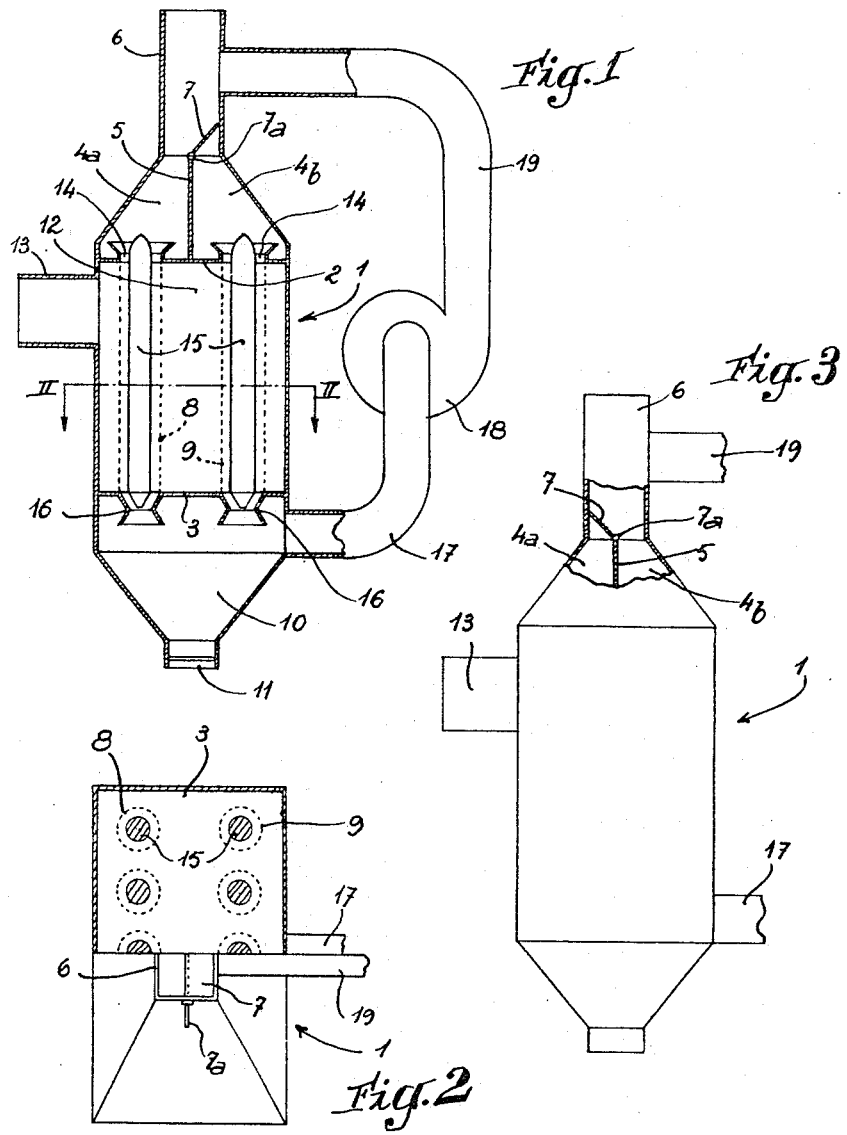

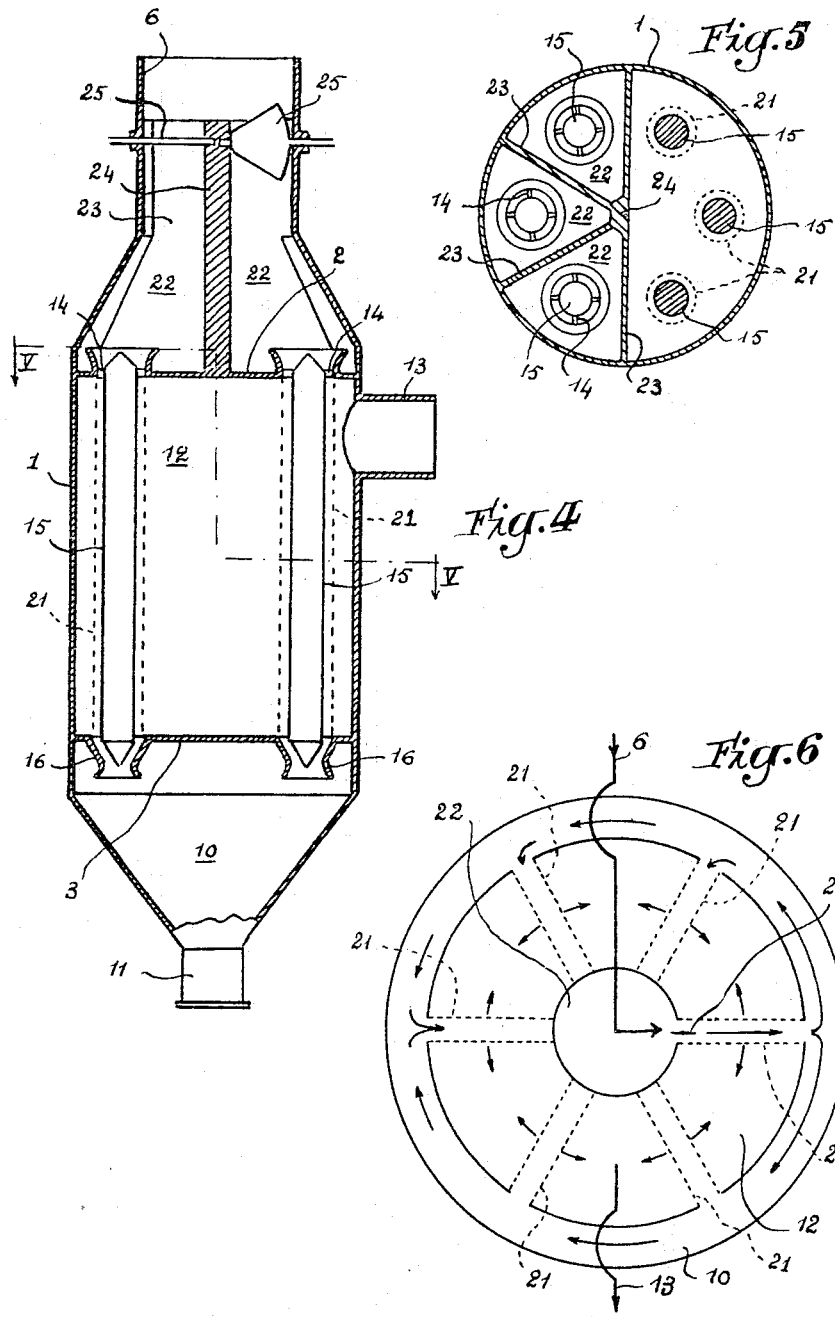

3,267,649
SLEEVE FILTERS AND CLEANING MEANS THEREFOR
Pierre Georges Vicard, 15 Cours Eugénie, Lyon, France
Filed Nov. 10, 1964, Ser. No. 410,060
Claims priority, application France, Nov. 25, 1963,
44,207, Patent 1,384,885; Mar. 5, 1964, 44,544,
Patent 85,461
1 Claim. (Cl. 55—286)

This invention relates generally to filters comprising substantially cylindrical filtering sleeves through the wall of which a gaseous or liquid fluid to be filtered passes radially and outwardly.

The invention is more especially concerned with filters of the kind above-referred to, wherein the operation is improved by imparting with each sleeve to the fluid to be filtered a high velocity parallel to the filtering wall of the sleeve, in such a manner as to dislodge and entrain the solid particles retained by the said wall. This may be obtained by disposing in the inlet end of the sleeves a set of helicoidal vanes, a volute or any other device adapted to cause the fluid to whirl within the sleeves. An axial inner core may further be mounted in the sleeves so as to reduce the cross-sectional area of the fluid passage. It is also convenient to recycle the fluid from the outlet end of the sleeves into the inlet end thereof in order to create within the sleeves a longitudinal flow component of high velocity.

In spite of these arrangements the particles retained by the filtering wall of the sleeves sometimes form a quite smooth or glossy layer on which the high velocity component of the fluid within the sleeve only has a quite limited action. The sleeves have then to be cleaned, which of course requires that the operation of the filter be stopped.

The present invention has for its object to provide an improved sleeve filter in which the solid particles retained by the filtering walls will be dislodged and entrained by the high velocity component of the fluid within the sleeves even if they have a tendency to form a quite smooth or glossy layer thereon.

In accordance with the present invention, in a filter of the kind comprising a plurality of filtering sleeves disposed within a filter casing, each sleeve having a first end adapted to be connected with the fluid inlet means of the filter and a second end which opens into a common chamber adapted to collect the impurities separated from the fluid, means are provided for selectively directing the fluid to be filtered into the first end of one or of some only of the sleeves, while the other sleeves receive this fluid through their second end from the said common collecting chamber, the respective roles of the sleeves being successively changed in a sudden manner during the operation of the filter in order to determine an under-pressure wave which contracts the sleeve or sleeves through which the fluid to be filtered was flowing between the said inlet means and the said common collecting chamber, and thus to break and detach the layer of impurities which may have formed on the filtering walls of the last-named sleeve or sleeves.

In the annexed drawings:

FIG. 1 is a vertical section of a first embodiment of a gas filter according to the invention.

FIG. 2 is a plan view thereof with parts in section along line II—II of FIG. 1.

FIG. 3 is an elevation with a fragmental section showing the movable inlet shutter of the filter at its second position.

FIG. 4 is a vertical section of a second embodiment of a filter for dust-laden gases.

FIG. 5 is a horizontal cross-section taken along line V—V of FIG. 4.

FIG. 6 is an explanatory diagram illustrating the operation of the filter of FIGS. 4 and 5.

The filter illustrated in FIGS. 1 and 2 is more particularly adapted to the treatment of dust-laden gases. It comprises a vertical casing 1 of elongated rectangular cross-section, in which are disposed two spaced horizontal partitions 2 and 3 which define three chambers. The upper chamber, of pyramidal shape, is itself divided in two portions or elementary chambers 4a and 4b by a vertical inner partition 5, the upper ends of these elementary chambers being connected with an inlet conduit 6 of rectangular cross-section. The upper end of the vertical partion 5 carries a hinged vane or shutter 7 which may isolate from the inlet conduit 6 either the elementary chamber 4b (position of FIG. 1) or the elementary chamber 4a (position of FIG. 3). This shutter 7 may be actuated for instance by means of a spindle 7a, as indicated in FIG. 2.

The horizontal partitions 2 and 3 have a number of orifices adapted to receive the ends of vertical cylindrical filtering sleeves disposed in two rows, the upper ends of the sleeves 8 of one row opening into the elementary chamber 4a, while the upper ends of the sleeves 9 of the other row open into the elementary chamber 4b. The lower end of sleeves 8 and 9 open into the lower chamber 10 situated below the lower horizontal partition 3. This chamber is adapted to form a dust-collecting hopper and it is provided for this purpose with a lower outlet 11 normally closed by an air-lock or any other appropriate device.

The intermediate chamber 12 situated between partitions 2 and 3 has a lateral outlet 13.

At the upper end of each sleeve 8 or 9 is mounted an annular set of helicoidal vanes 14 which surrounds the upper end of a core 15. The latter extends axially through the sleeve within which it defines an annular gas passage of reduced cross-sectional area. Its conical lower end projects into a convergent-divergent-nozzle 16 disposed on the underside of the lower horizontal partition 3 beneath the lower end of the sleeve.

A conduit 17 connects the lower chamber 10 with the inlet of a recycling blower 18 the outlet of which is connected by another conduit 19 with the above-described inlet conduit 6.

The filter described operates as follows:

Assuming the shutter 7 is at the position illustrated in FIG. 1, the elementary chamber 4b is cut from the gas inlet conduit 6 and the gas to be filtered flows through the elementary chamber 4a into the upper end of the sleeves 8, the helicoidal vanes 14 imparting to the gas flow a whirling or helicoidal motion of high velocity. A fraction of the entering gas passes radially through the filtering walls of the sleeves into the intermediate chamber 12, most of the dust particles retained by the filtering walls being dislodged and entrained by the helicoidal gas flow. The remainder of the gas flow issues from the sleeves 8 into the lower dust-collecting chamber 10 through the convergent-divergent nozzles 16, together with the entrained dust particles, these particles settling onto the bottom of the chamber. A fraction of the gas from the dust-collecting chamber 10 flows upwardly into the sleeves 9 through the lower nozzles 16 thereof and passes into the intermediate chamber 12 through the filtering wall of the said sleeves 9.

The filtered gas issues from the intermediate chamber 12 through the outlet 13.

The remainder of the gas which enters the dust-collecting chamber 10 flows through the conduit 17 and is forced by the recycling blower 18 into the inlet conduit 6. This re-cycling of the dust-laden gas considerably increases the helicoidal gas flow through the sleeves 8 and therefore enhances the action thereof on the particles retained by the filtering walls of the sleeves 8.

After a pre-determined time the shutter 7 is rapidly brought from the position of FIG. 1 to the position of FIG. 3. The dust-laden gas now enters the elementary chamber 4b. It is obvious that the operation of the filter remains as above explained, apart from the fact that the respective rôles of the sleeves 8 and 9 have been exchanged. The downwardly directed helicoidal flow now takes place through the sleeves 9, while the sleeves 8 receive a fraction of the gas which enters the dust-collecting chamber 10.

But the sudden inversion of the shutter 7 has another consequence, namely that owing to the inertia of the gas streams within the apparatus, it determines in the sleeves 8 an underpressure wave which causes a noticeable contraction of the filtering wall thereof. If therefore, in splite of the action of the high-velocity helicoidal flow through the sleeves 8 the dust particles have formed a smooth and glossy layer on the said filtering wall, this layer cracks or breaks into pieces which fall down into the dust-collecting chamber 10.

After another period of operation the shutter 7 is returned to the position of FIG. 1.

It will be appreciated that each group of sleeves 8 or 9 is in turn submitted to the action of a high-velocity helicoidal flow of dust laden gas which sweeps the filtering wall of the sleeves, and that all the sleeves 8 and 9 are alternately submitted to an underpressure wave which breaks the smooth dust layer which may have formed on their said wall.

It is to be remarked that the recycling arrangement 17–18–19 is only effective for one group of sleeves (sleeves 8 in the case of FIG. 1). But this arrangement could be caused to act on both groups of sleeves, if desired, by connecting the inlet of the re-cycling blower 18, through any kind of two-way valve, with the elementary chamber 4a or 4b which is isolated by shutter 7 from the gas inlet conduit 6, the conduit 17 of FIGS. 1–3 then being suppressed.

It should further be noted that the helicoidal vanes 14 could be dispensed with in some cases. The high-velocity gas flow within the sleeves 8 or 9 would then be merely longitudinal.

Though the recycling of a portion of the dust-laden gas is of considerable advantage in that it increases the flow rate through the sleeves which receive directly the gas from the gas inlet 6 (sleeves 8 in FIG. 1), it could be dispensed with in some cases when the periodic contraction of the sleeves is sufficient to get rid of the dust layer formed on the filtering walls.

In the embodiment of FIGS. 4 to 6, the casing 1 is of circular cross-section and the vertical sleeves 21 are disposed in a circular row between the partitions 2 and 3. In the example shown the filter comprises six sleeves 21. The upper frusto-conical space situated between the upper partition 2 and the gas inlet 6 is divided into six elementary chambers 22 by radial partitions 23 which join against a central column 24 (which may be hollow in actual practice). These elementary chambers extend somewhat upwardly into the gas inlet 6 and each one comprises adjacent its upper end a butterfly valve 25 by means of wihch it may be isolated from the gas inlet.

In the explanatory diagram of FIG. 7 the sleeves 21 have been illustrated as radially disposed between an inner space which corresponds to the upper end of the elementary chambers 22 and an outer annular space which corresponds to the lower dust collecting chamber 10, the intermediate annular space corresponding to the intermediate chamber 12. The valve 25 of one only of sleeve 21 is open, while those of the other sleeves are closed. The dust-laden gas from the gas inlet 6 enters the sleeve whose valve 25 is open. A small portion of this gas passes through the filtering wall of the sleeve and thus reaches the intermediate or filtered gas chamber 12. The remainder of the gas enters the dust-collecting chamber 10 from which it flows into the sleeves 21 whose valves 25 are closed. The flow rate through the inlet of the sleeve 21 whose valve 25 is open is therefore equal to six times the gas volume which may be filtered by a single sleeve within one unit of time. The flow rate through the outlet of the said sleeve is still equal to five times this same volume. The gas velocity through the said sleeve is therefore quite high and this dispenses with any re-cycling arrangement.

After a pre-determined time the valve 25 which was open is suddenly closed, another valve 25 being simultaneously opened, as for instance the valve 25 of the next sleeve in the clockwise or in the counterclockwise direction. As in the case of FIGS. 1 to 3 this operation causes a temporary contraction of the sleeve which is suddenly cut from the gas inlet and breaks the dust layer which may have formed within this sleeve. The valves 25 being operated in succession, each sleeve is in turn submitted to the high velocity gas flow and to the underpressure wave.

It will be appreciated that it would be possible to open more than one valve at each time. Each element chamber 22 could correspond to two or more sleeves 21. Instead of valves 25, the apparatus could comprise a rotary distributor which would be actuated by successive steps in order to obtain a sudden switching of the sleeves.

I claim:

A fluid filter comprising first and second groups of substantially tubular vertical sleeves each being comprised of a filtering wall and having an upper end and a lower end; a common collecting chamber disposed below said first and second groups of sleeves and communicating with the lower ends thereof; a fluid inlet chamber disposed above said first and second groups of sleeves and communicating with the upper ends thereof, said inlet chamber being of substantially pyramidal shape; a fluid inlet conduit opening into the upper end of said fluid inlet chamber; a substantially vertical partition dividing said fluid inlet chamber into a first and a second portions respectively connected with the upper ends of said first and second groups of sleeves, said partition having an upper edge; a flap hinged to the upper edge of said partition to form a two-way valve which alternately isolates from said fluid inlet conduit either said first portion of said fluid inlet chamber or said second portion thereof; means to collect the fluid filtered through the filtering walls of said sleeves; and means to re-cycle a portion of the fluid to be filtered from said collecting chamber into said fluid inlet conduit.

References Cited by the Examiner

UNITED STATES PATENTS

| 735,904 | 8/1903 | Picher et al. | 55—341 |
| 1,349,480 | 8/1920 | Wilsmore | 55—286 |
| 2,201,301 | 5/1940 | Richardson | 55—347 X |
| 2,506,273 | 5/1950 | Linderoth | 55—338 |
| 2,853,151 | 9/1958 | Guldemond | 55—127 |
| 2,868,320 | 1/1959 | Westlin | 55—341 X |

FOREIGN PATENTS

| 1,118,340 | 3/1956 | France. |
| 838,108 | 5/1952 | Germany. |
| 737,457 | 9/1955 | Great Britain. |

ROBERT F. BURNETT, *Primary Examiner.*